United States Patent
Olson et al.

(10) Patent No.: US 7,543,145 B2
(45) Date of Patent: Jun. 2, 2009

(54) SYSTEM AND METHOD FOR PROTECTING CONFIGURATION SETTINGS IN DISTRIBUTED TEXT-BASED CONFIGURATION FILES

(75) Inventors: Erik B. Olson, Sammamish, WA (US);
Manu Vasandani, Bellevue, WA (US);
Marchel Cohn, Shoreline, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 11/072,733

(22) Filed: Mar. 3, 2005

(65) Prior Publication Data

US 2006/0200665 A1    Sep. 7, 2006

(51) Int. Cl.
*H04L 9/00* (2006.01)
*H04L 9/32* (2006.01)
*G06F 12/14* (2006.01)
*G06F 11/30* (2006.01)

(52) U.S. Cl. .................................. 713/167; 713/193
(58) Field of Classification Search ................. 713/167, 713/193
See application file for complete search history.

(56) References Cited

U.S. PATENT DOCUMENTS

2007/0079142 A1*   4/2007   Leone et al. ................. 713/193

* cited by examiner

*Primary Examiner*—Kambiz Zand
*Assistant Examiner*—Aubrey H Wyszynski
(74) *Attorney, Agent, or Firm*—Merchant & Gould; Ryan T. Grace

(57) ABSTRACT

System and methods for protecting sensitive data stored in a text-based configuration file. In a web server application, data associated with sensitive information such as connection information for a remote database may be stored within a configuration file and accessed whenever a request for information from that database is received. To prevent unwanted access to remote database, the portion of the configuration file with sensitive information is encrypted. A decryption provider selected by the requesting server or client application decrypts the sensitive data using the decryption key, retrieves protected data from the remote database, and the configuration server provides a response based on the sensitive data protecting access to the remote database. The encryption/decryption process is transparent to the web server application consuming the configuration.

20 Claims, 7 Drawing Sheets

SYSTEM AND METHOD FOR PROTECTING CONFIGURATION SETTINGS IN DISTRIBUTED TEXT-BASED CONFIGURATION FILES

BACKGROUND OF THE INVENTION

A computer network includes servers that provide service to connected computing devices. One of the main concerns in such a network is secure communications. Secure communication is an integral part of securing distributed applications to protect sensitive data, including credentials, passed to and from an application, and between application tiers. Storing database connection strings securely is particularly significant. Connection strings may include clear text user names and passwords. Data access may be performed by using the process identity of the calling process, one or more service identities, or the original caller's identity (with impersonation/delegation). The choice may be determined by the data access model, trusted subsystem or impersonation/delegation. Securing data that flows across the network is another important aspect of secure communication.

The key gatekeepers for a secure data exchange system are: data store used to maintain the database connection string, server login (as determined by the server name specified in the connection string), database login (as determined by the database name specified in the connection string), and permissions attached to individual database objects.

Hard-coding the sensitive information such as storing it at the database, in registry files, and the like, causes the use and change of such information to be difficult and time-consuming.

SUMMARY OF THE INVENTION

Embodiments of the present invention relate to a system and method for providing protection to sensitive data related to configuration settings in a text-based configuration file. In a configuration server application, data associated with sensitive information such as connection information for a remote database may be stored within a configuration file and accessed whenever information from the remote database is required by the configuration server application. To prevent unwanted access to the remote database, a portion of the configuration file with sensitive information may be encrypted by an administrator of a web server application using their own encryption method. A decryption key provided by a decryption provider may be used to decrypt the sensitive data, which is then used to retrieve protected data from the remote database and provide a response to the requesting web server. The encryption/decryption process may be transparent to the web server.

In accordance with one aspect of the present invention, a computer-implemented method for protecting sensitive data is provided. The method includes retrieving protected data that corresponds to the configuration settings from a data store, determining a provider for transforming the protected data, and transforming the protected data into a consumable form such that the protected data is transformed and consumed while protection of the data is transparent to a web server.

The method may further include receiving a request before retrieving the protected data, and preparing and sending a response to the requestor based on the transformed data. In another aspect of the present invention, the protected data may be encrypted within the configuration file and the transforming process may include decrypting the encrypted data using a decryption key received from a decryption provider. The decryption provider is itself configurable and details of decryption transformation are not known to an entity preparing the response.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
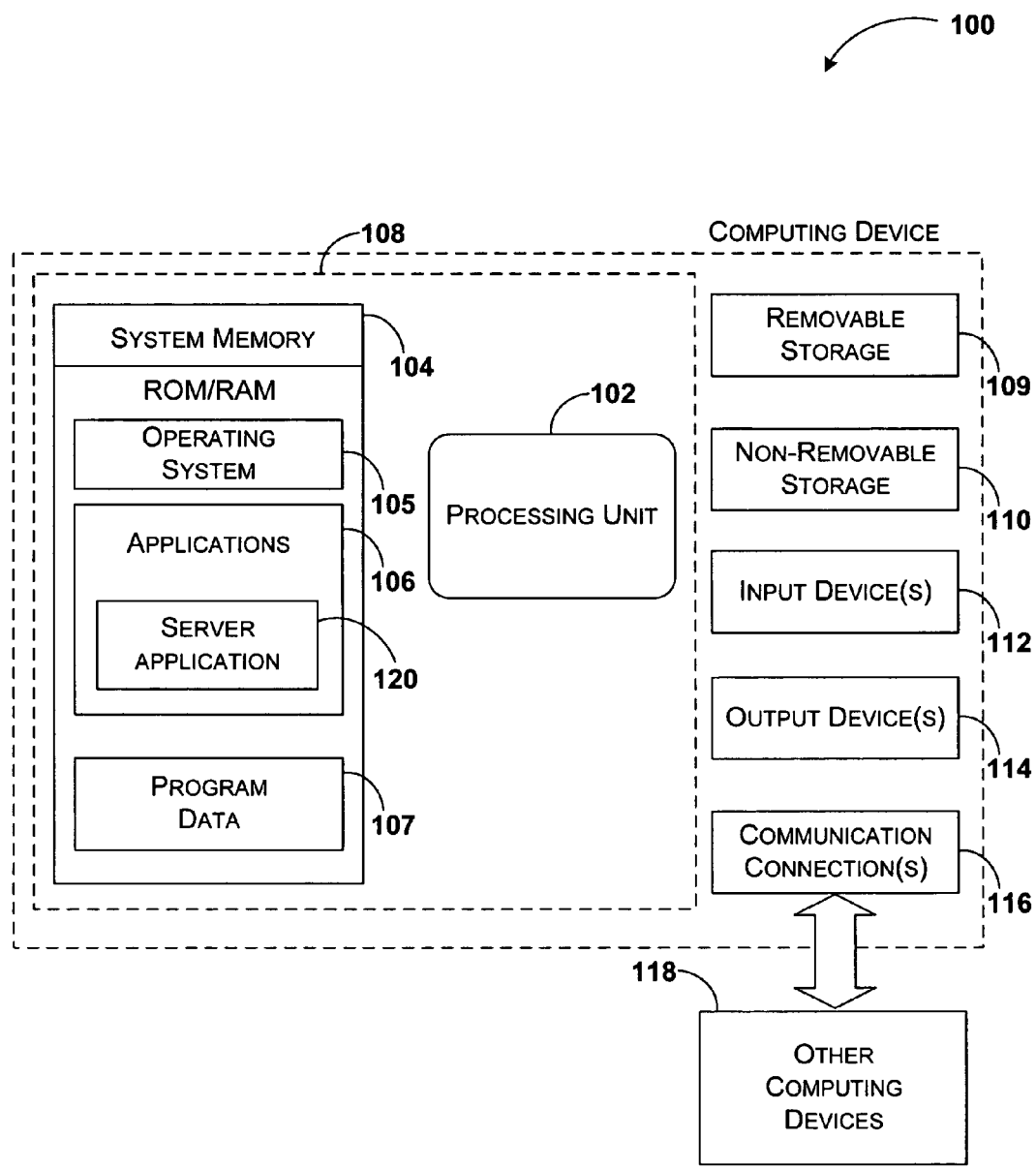
FIG. 1 illustrates a computing device that may be used according to an example embodiment.

Referring to FIG. 1, an example system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 1 18, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include server application 120, which provides server services for other servers, clients (client devices and applications) over a network. Server application 120 may employ a text-based configuration file for the services it provides. Such a text-based configuration files may include sensitive data such as connection information to a secure database, access passwords, and the like. The sensitive data within the configuration file may be protected by encryption. The functionality represented by server application 120 may be further supported by additional input devices, 112, output devices 1 14, and communication connection(s) 116 that are included in computing device 100 for protecting sensitive data included in the configuration file.

Illustrative Embodiments for Protecting Configuration Settings in Text-Based Configuration Files Embodiments of the present invention are related to protecting sensitive data within text-based configuration files. Server applications may provide services to clients involving data that needs to be protected. For example, a credit card verification server may receive requests from servers over a network for verification of customer credit card information. While the credit card information itself may reside on a secure database separate from the credit card verification server itself, a configuration file used by the application may include information related to connection to the secure database such as network address, password(s), and the like.

The present disclosure describes a method whereby sensitive data within a text-based configuration file may be protected by encryption, and only a web server with the decryption tool may access the sensitive data, while the encryption/decryption process is transparent to the web server.

In one embodiment, various encryption/decryption methods may be used for different parts of the sensitive data associated with different configuration clients or applications. That way, each configuration client can implement its own encryption/decryption method provider for the portion of the configuration file that is associated with that configuration client or application.

Clients for such a system may include servers communicating with a configuration server, web servers, client devices and client applications running on machines communicating with the configuration server, and other applications running on the configuration server itself.

Figure 2:
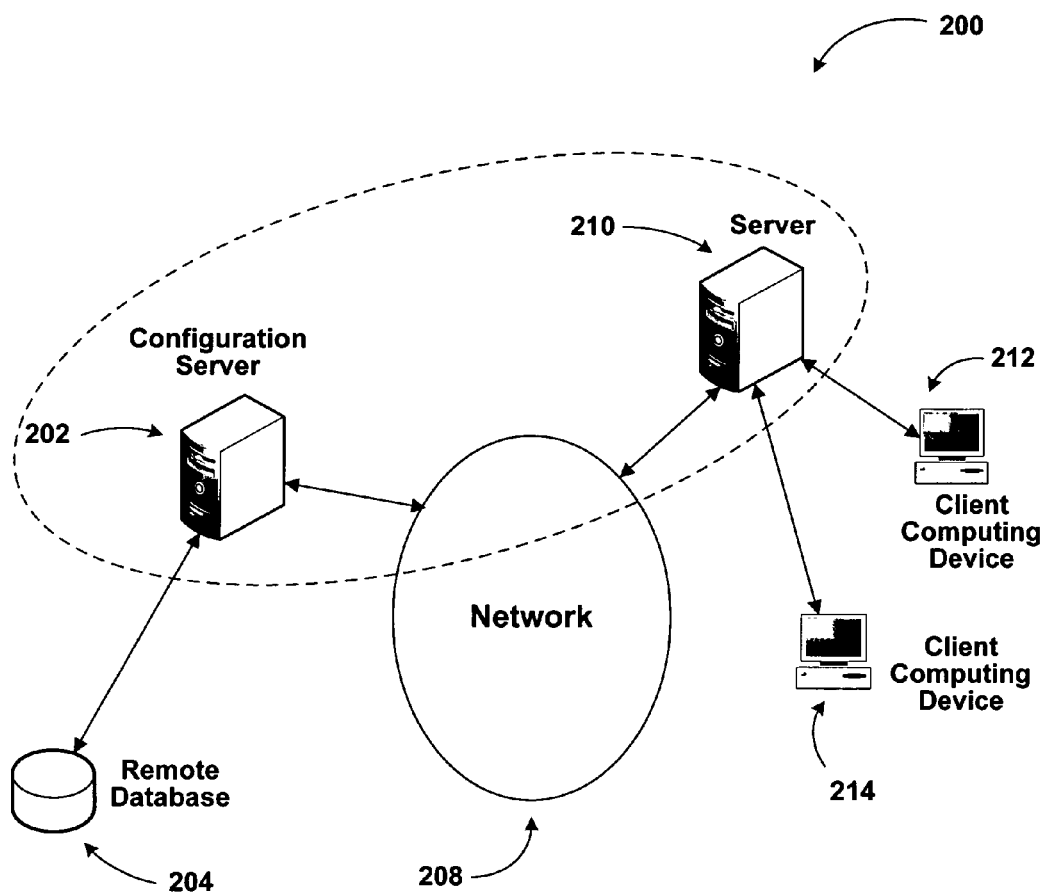
FIG. 2 illustrates a system of servers and clients, where one example embodiment of protecting configuration settings in text-based configuration files can be implemented.

FIG. 2 illustrates system 200 of servers and clients, where one example embodiment of protecting configuration settings in text-based configuration files can be implemented.

System 200 may comprise any topology servers, clients, Internet service providers, and communication media. Also, system 200 may have a static or dynamic topology without departing from the spirit and scope of the present invention.

System 200 includes at least one configuration server 202, which provides services to other nodes of network 208 that may include server 210, client computing devices 212 and 214. Services provided by configuration server 202 may depend on a type of network 208. If network 208 is a secure network such an enterprise network, services may include network related configuration, access to a list of passwords and other security-related information for clients (as well as servers) on network 208 to access outside resources or resources within network 208 with a higher security level. Configuration server 202 may be further coupled to remote database 204, which may be employed to store protected data.

In one embodiment, remote database 204 may store data associated with a request from server 210. Server 210 may be sending the request for an application that is associated with one of the client computing devices 212 or 214. For a number of reasons, the data may be classified as protected data and not made available to everyone who requests it. In that case, an application at configuration server 202 may include connection information for remote database 204 such as its IP address, access password(s), and the like. The application at configuration server 202 may retrieve the protected data for each request, perform necessary actions such as filtering the data, using it to prepare a response, and the like, and provide the response to the requesting client. The connection information for remote database 204 may be encrypted in configuration server 202 as sensitive data and the encryption/decryption process maintained transparent to the requesting server. This way, client computing devices 212, 214, or server 210 may receive the services they request without having access to the protected data associated with the request.

In another embodiment, server 210 may reside physically in the same computing device as configuration server 202 and represent a separate application within the same device. Throughout the specification, the term configuration client is also used to refer to server 210 in such an arrangement.

Each node of network 208 may comprise any device that is connected to network 208. The nodes may transmit and receive data packets and also may pass data packets to other nodes in accordance with the routing protocol of network 208. Each node may be a fixed device or a mobile device. For example, server 210 may include a computing device that is similar to computing device 100 described above in conjunction with FIG. 1. The nodes may also include mobile computing devices, client devices, as well as client applications running on computing devices. The term "client" is used hereinafter to mean both client devices and applications including web browsers that make a request to a web server. Other embodiments may include other configurations of nodes. For example, a node may include a dedicated computer that only routes data packets from one node to another.

In one example embodiment of the present invention, network 208 has a network topology in which nodes are connected with several redundant connections between the nodes. Network 208 may include a full mesh where every node is connected to every other node in the network. Other topologies may include one or more client subnets connected to network 208. These client subnets may have a plurality of clients connected thereto. For example, the client subnets may include a set of computing devices connected to server 210 through a network connection other than the network (not shown). These clients in the subnet gain access to other resources by routing data traffic through server 210 to network 208. Accessing network 208 through server 210 may allow the client devices to gain access to the Internet and other resources with server 210 managing the routing of the data. The various topologies for network 208 are endless and will not be further set forth herein.

Network 208 provides communication between the nodes described above. By way of example, and not limitation, network 208 may include wired media such as a wired network or direct-wired connection, and wireless media such as acoustic, RF, infrared and other wireless media.

Figure 3:
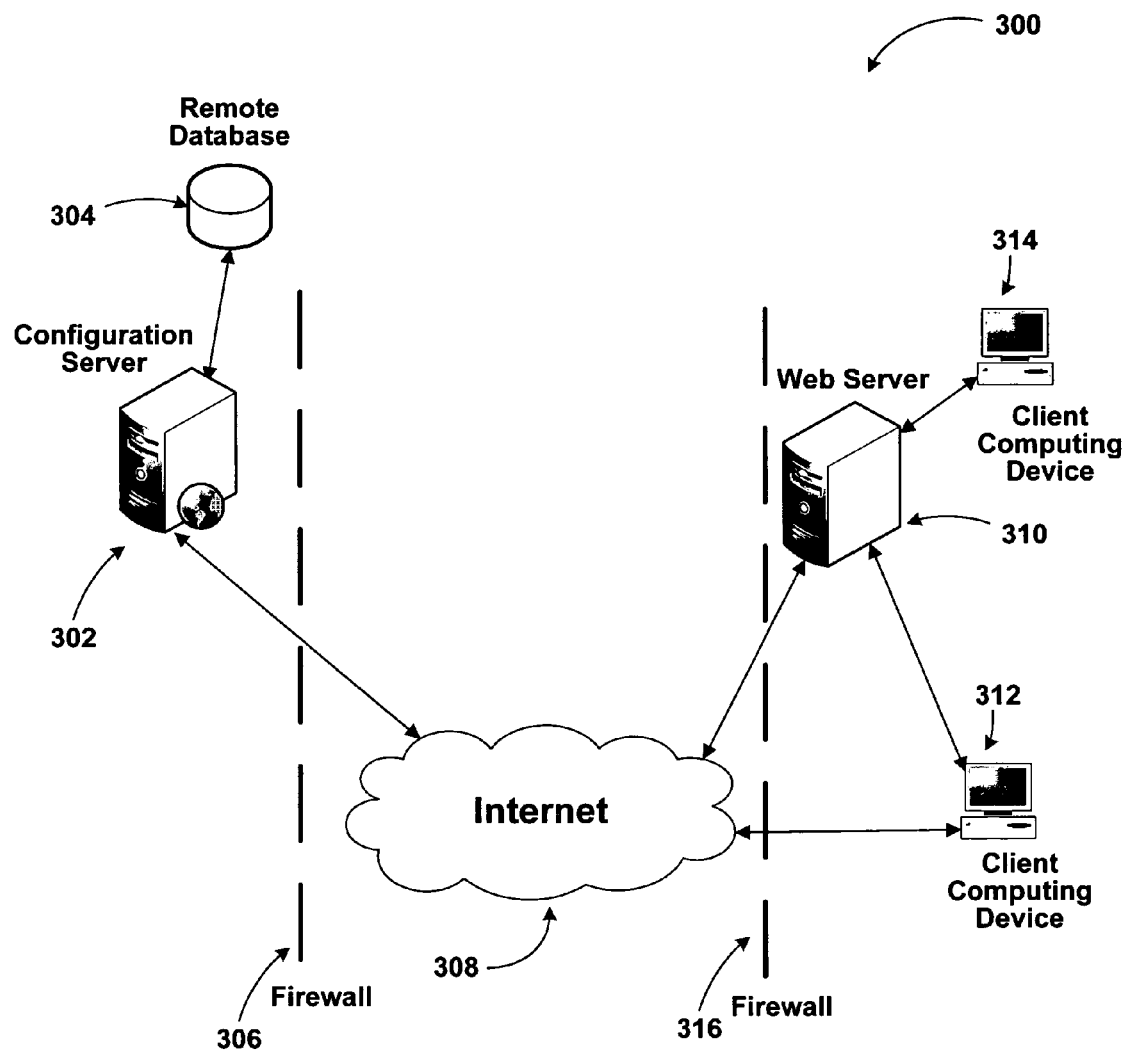
FIG. 3 illustrates another system of servers and clients, where one example embodiment of protecting configuration settings in text-based configuration files can be implemented.

FIG. 3 illustrates system 300 of servers and clients, where another example embodiment of protecting configuration settings in text-based configuration files can be implemented. Components of system 300 that are similarly named as in FIG. 2 are arranged to operate likewise.

Network 208 of FIG. 2 is represented as Internet 308 in FIG. 3. In one embodiment various nodes such as those described above in conjunction with FIG. 2 may communicate over the Internet 308. In such an embodiment, configuration server 302 may reside behind a security system such as firewall 306.

For example, configuration server 302 may perform commercial transaction related services such as credit card transactions for E-commerce purchases etc. In such an application, client data including, but not limited to, credit card information may be stored at a remote database 304. As part of the E-commerce transaction, web browsers residing on client computing devices 312 and 314 may request credit card information from web server 310. The browsers are typically not allowed to connect to configuration server 302 directly. Client devices 312, 314 and web server 310 may be behind another firewall 316. Web server 310 may then present a request to configuration server 302 associated with the request from one of the client devices. Configuration server 302 includes information in various configuration files associated with connecting to remote database 304. The information associated with connecting to remote database 304, such as credentials or passwords, is sensitive data within the configuration files.

As in FIG. 2, web server 310 and configuration server 302 may reside in the same physical machine in one embodiment. In another embodiment, they may be server applications running on the same computing device.

It is desirable in an example system such as the one described above, that a client or web server (e.g. client computing devices 312 and 314 or web server 310) be prevented from reading the sensitive data within the configuration files, even if the client gains access to the configuration file. According to one embodiment, the sensitive data portion of the configuration files is encrypted such that a client without decryption access is prevented from reading the sensitive data. Configuration files stored and utilized by configuration server 302 may be eXtensible Mark-up Language (XML)-based text files in a hierarchical structure as described below.

Figure 4:
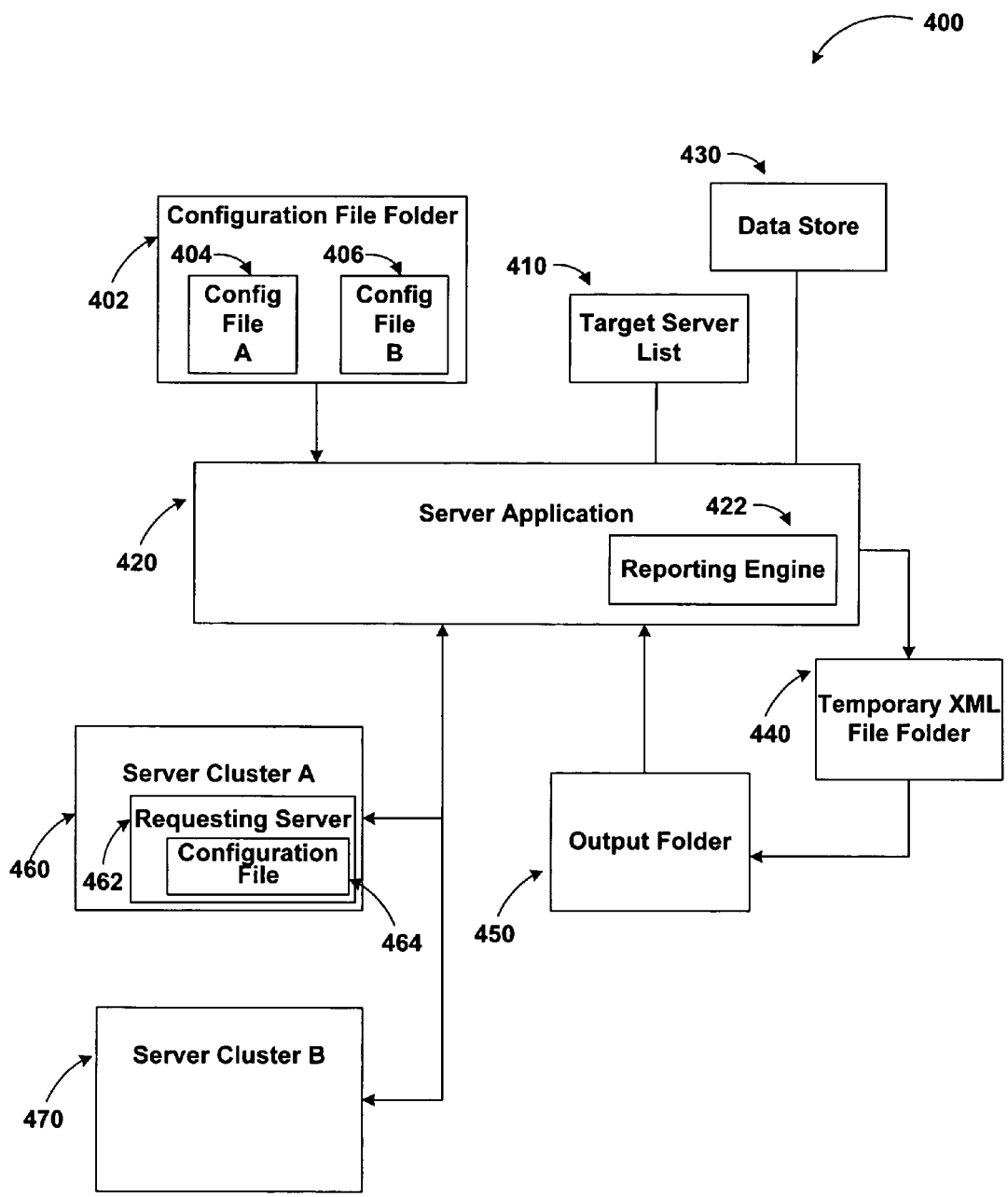
FIG. 4 is functional block diagram illustrating a system for protecting configuration settings in text-based configuration files, in accordance with the present invention.

FIG. 4 is functional block diagram illustrating system 400 for protecting configuration settings in text-based configuration files. System 400 includes server application 420, configuration file folder 402, data store information 430, target server list 410, server cluster A 460, server cluster B 470, XML file folder 440, and output folder 450. Server application 420 includes reporting engine 422. Configuration file folder 402 includes configuration file A 404 and configuration file B 406. Server cluster A 460 includes requesting server 462, which includes associated configuration file 464. Server cluster B 470 is similarly organized but is not illustrated.

Configuration files may be XML-based text files that can appear in any directory on a web application server. Each configuration file may apply configuration settings to the directory it is located in and to all virtual child directories beneath it. Settings in child directories can optionally override or modify settings specified in parent directories. The root configuration file may provide default configuration settings for the entire machine. Some applications are set up to prevent direct browser access to configuration files to ensure that their values do not become public.

At run time server application may use configuration files to hierarchically compute a unique collection of settings for each incoming URL target request (these settings are calculated only once and then cached across subsequent requests.

For example, the configuration settings for the URL http://myserver/myapplication/mydir/page.aspx may be computed by applying configuration file settings in the following order:

Base configuration settings for machine

C: \OS\\config\machine.config

Overridden by the configuration settings for the site (or the root application)

C:\wwwroot\web.config

Overridden by application configuration settings

D:\MyApplication\web.config

Overridden by subdirectory configuration settings

D:\WMyApplication\MyDir\web.config

If a web.config file is present at the root directory for a site, for example "\wwwroot", its configuration settings apply to every application in that site. Note that the presence of a web.config file within a given directory or application root is completely optional. If a web.config file is not present, all configuration settings for the directory are automatically inherited from the parent directory.

In system 400, server application 420 communicates with configuration file folder 402, data store 430, target server list 410, server cluster A 460, server cluster B 470, temporary XML file folder 440, and output folder 450. Temporary XML file folder 440 communicates with output folder 450.

Figure 5:
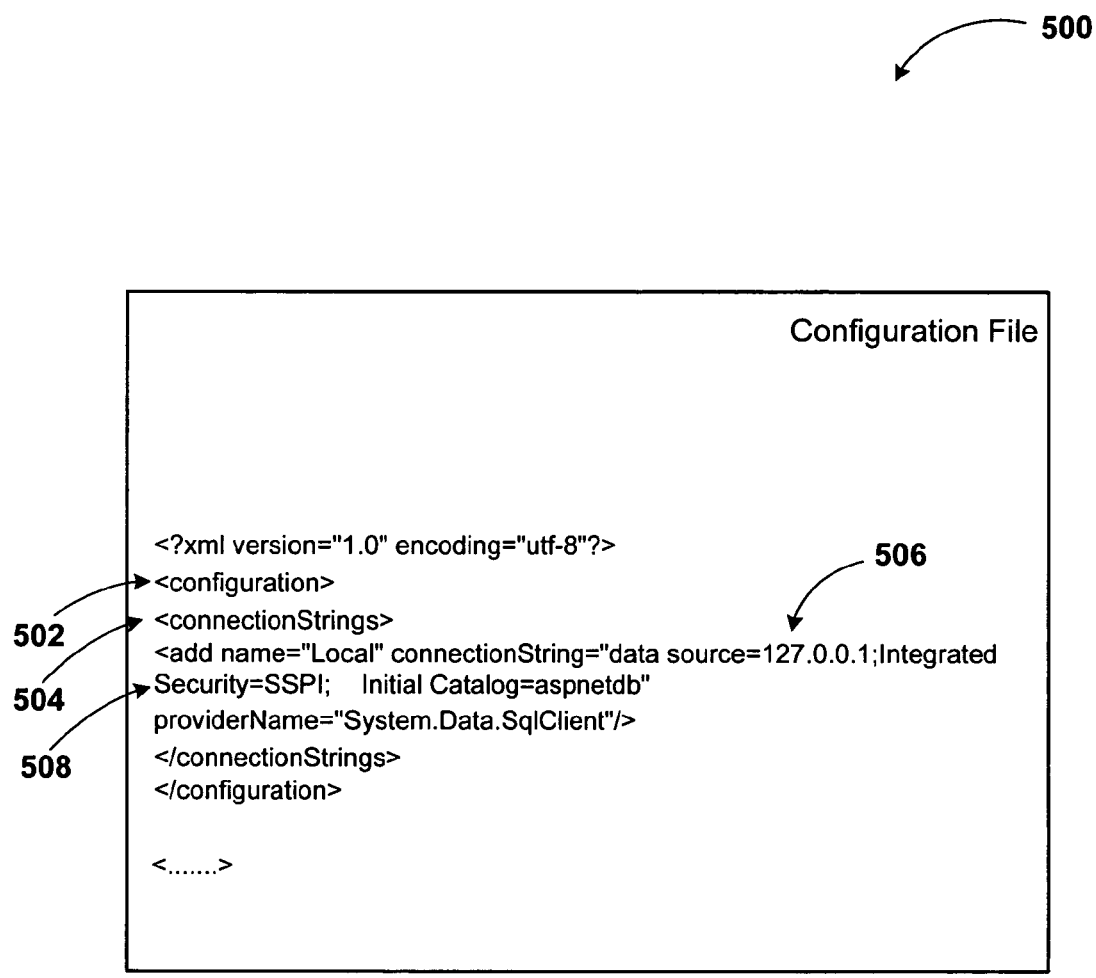
FIG. 5 illustrates an example configuration file before encryption.

Server application 420 includes a command line utility that accepts input parameters from the client. The client selects a configuration file (e.g., configuration file A 404) that is retrieved from configuration file folder 420 and loaded onto server application 420. An example configuration file is shown in FIG. 5. The configuration file includes configuration settings for a set of servers. In one embodiment, the configuration file is an XML file. However, the invention is not limited to XML files or the illustrated arrangement. Other arrangements may be implemented without departing from the scope and spirit of the invention.

The client may be on of server clusters A and B (460, 470) or a client machine or application managed by server clusters A or B. In one embodiment, a request by the client may be associated with sensitive data such as information related to data store 430. Because any client that has access to configuration file A 404 may obtain the sensitive data, protection is provided by encrypting the sensitive data portion of configuration file A 404.

In another embodiment, the request from the client may be accompanied by decryption provider information. To accommodate client preferences, configuration file A 404 may include sensitive data encrypted employing various methods including, but not limited to, RSA encryption, password wrapped encryption, computation-based encryption, and the like. Once server application 420 detects the decryption key from the client, it decrypts the sensitive data portion of configuration file A 404. Server application 420 then prepares a response to the request using the sensitive data. Server application 420 may then provide the response to the client employing temporary XML file folder 440 and/or output folder 450.

The decryption may be user or machine specific. Keys protected under a user-specific protection mode can only be decrypted by a user account that encrypted them. This method may require a user profile to be loaded for the account under which the process is running. Under machine-specific protection, a user profile may not need to be loaded, however, any user with access to the requesting machine may obtain sensitive data through that machine.

Server application 420 may request the configuration and have it be transparently decrypted by a configured provider, which supplies the decryption key separately.

In a further embodiment, the request may involve an action by server application 420 related to at least one other server. For example, server application 420 may provide access to a resource managed by a target server include in target server list 410. In that case, target server list 410 may be loaded onto server application 420 by a command prompt or a file upon decryption of the sensitive data portion of configuration file A 404. Configuration file A 404 may include location and credential information for target server list 410.

In one embodiment, decryption information may be included in configuration 464 of requesting server 462. Server application 420 may load the configuration file associated with the requesting server and decrypt the sensitive data based on the configuration. Configuration file 464 may be an XML file. Configuration file 464 may be parsed such that any XML elements that match XML elements in the corresponding configuration file are located. In another embodiment, the XML elements may not be locatable by name, and an attribute search is required to locate the element.

Reporting engine 422 may generate a report that includes a response to the request for each configuration setting depending on the request type. For example, a request may include verification of customer information as well as access to a resource based on the verification. Accordingly, server application 420 may generate one response for verification and another for providing access to the resource managed by a target server on target server list 410. The reports may be dynamically altered to include all configuration settings selected in the configuration file.

As mentioned above, lack of decryption information or incorrect decryption information may result in an error message issued by server application 420. Server application 420 may be arranged to provide a simple error message to the requesting client, if the request originates from an unsecure source such as a browser outside a firewall. In another embodiment, server application 420 may be arranged to provide detailed information about the error, if the request originates from a secure source such as within the same machine where server application 420 resides or another machine within the firewall. Such a feature may prove useful for developers, system administrators, and the like.

FIG. 5 illustrates example configuration file 500 before encryption. Configuration file 500 may include multiple configuration settings. The example configuration file in FIG. 5 is shown with one example configuration setting 502 that defines connection strings 504 for a data store (e.g. IP address 506 for the data source, security type 508, etc.). A client having access to the example configuration file may access the data source directly using the information included in configuration file 500.

Figure 6:
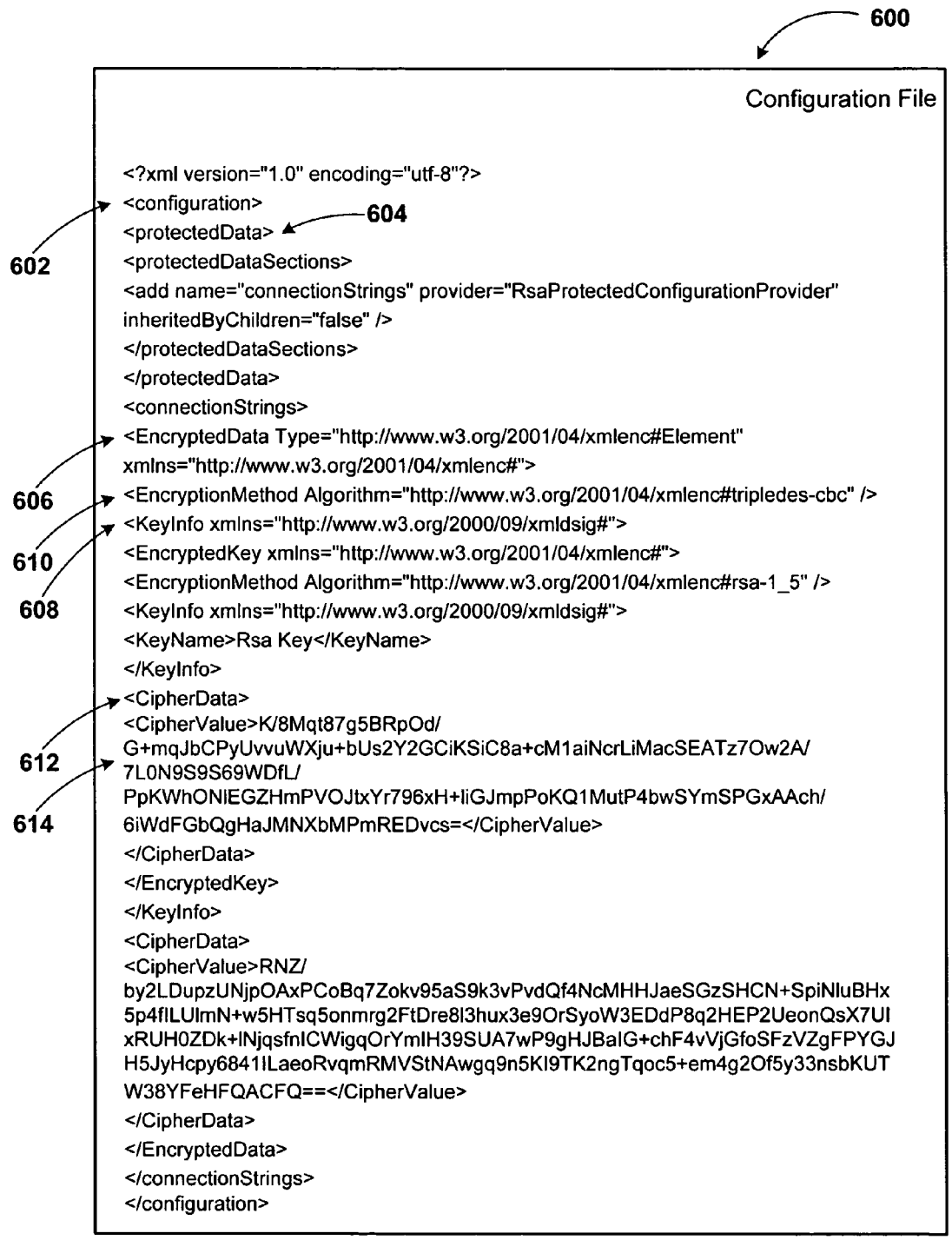
FIG. 6 illustrates an example configuration file after encryption, in accordance with the present invention.

FIG. 6 illustrates example configuration file 500 after encryption of the sensitive data. As shown in the figure, encrypted configuration file 600 includes under configuration settings 602 section designated as "protectedData" 604. Under "protectedData" 604, a name and a provider for encryption of the protected section is given. Further below the protected section is indicated by the name (in this example connectionStrings). Information provided in the protected section includes addresses where encryption type 606, encryption method 610, key 608, and other elements of encryption may be obtained. The encryption information is followed by the section "CipherData" 612, which includes encrypted sensitive data 614.

A web server requesting information from a configuration server with the encrypted configuration file 600 may receive initially a request for decryption provider information or send the decryption provider information along with the request. The configuration server then finds and asks the decryption provider to decrypt the encrypted data and prepares a response to the request based on the decrypted sensitive data. If the decryption provider information is incorrect or riot provided, the web server may receive an error message back as described previously in conjunction with FIG. 4.

Example configuration files 500 and 600 shown in FIGS. 5 and 6 are provided for illustration purposes only. The invention is not limited to these examples. Various embodiments of the present invention may be implemented in other ways without departing from the scope and spirit of the invention.

Figure 7:
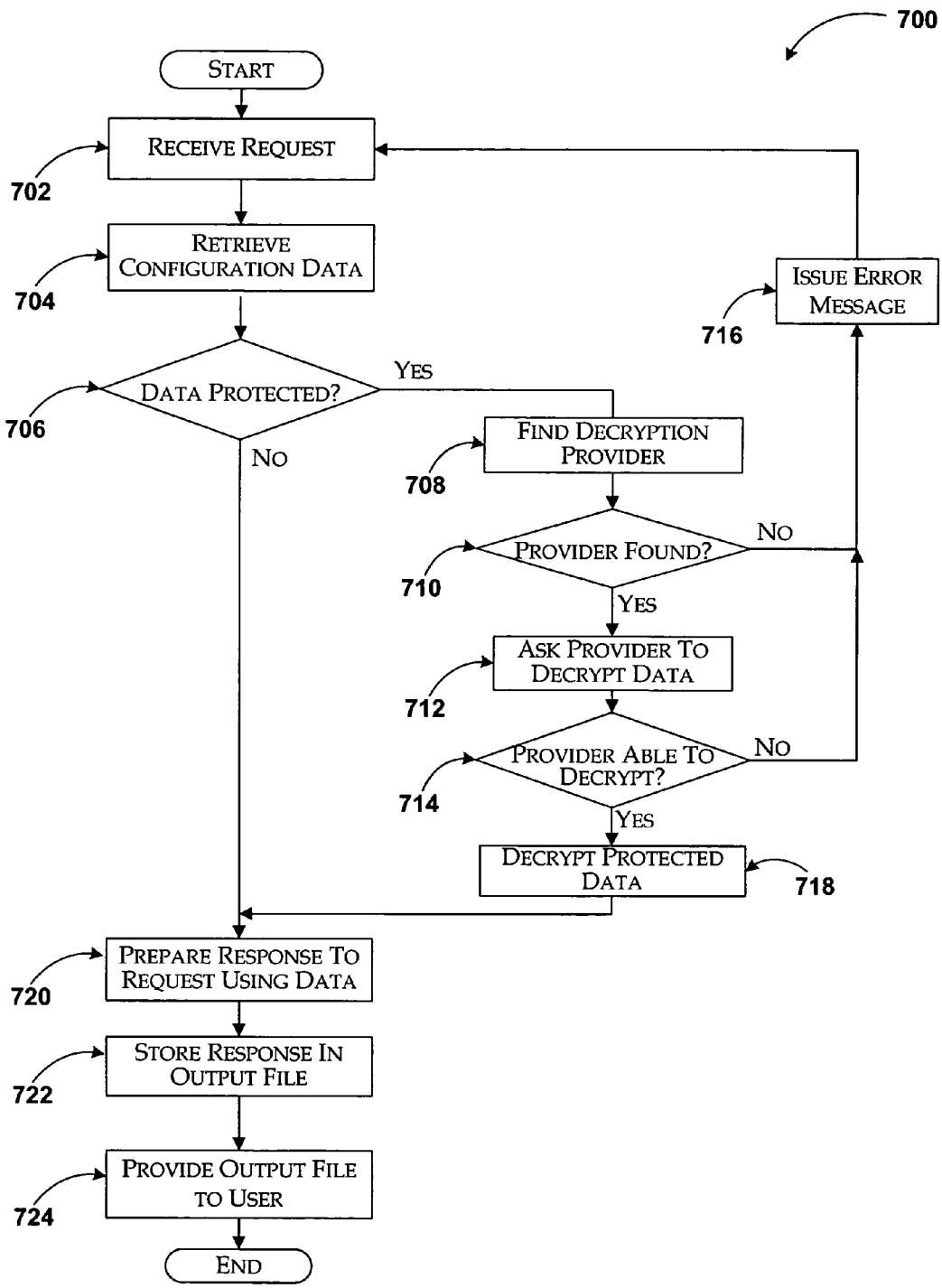
FIG. 7 is a logic flow diagram illustrating a process for protecting configuration settings in text-based configuration files.

FIG. 7 is logic flow diagram illustrating process 700 for protecting configuration settings in text-based configuration files. Process 700 may be implemented in a configuration server such as configuration server 302 of FIG. 3. Process 700 starts at block 702 where a request is received. Processing then moves to block 704.

At block 704, a server application running on the configuration server retrieves data in response to the request. Portions of data stored within a configuration file in a hierarchical system may be protected. According to one embodiment, protection may be provided by encrypting the portion of the configuration file that includes the data to be protected. The encryption method may include symmetric key encryption, public key encryption, and the like.

In another embodiment, the protected data may be associated with other sensitive data stored elsewhere. For example, the other sensitive data may include customer information such as credit card numbers, identification information, and the like, and be stored at a remote database. The protected data may include connection information associated with the remote database such as IP address for the database, password for connection, and the like. In this example, direct access by a client or another server to the remote database is prevented by encrypting the protected data. Processing advances to decision block 706 next.

At decision block 706, a determination is made whether the data is protected. If the data is protected, processing moves to block 708. Otherwise, processing advances to block 720.

At block 708, a decryption provider is sought. Decryption provider information may be provided by the requesting web server or client application. Processing then proceeds to decision block 710. At decision block 710, a determination is made whether the decryption provider is found. If the decryption provider is not found, processing moves to block 716, where an error message is issued. Processing then returns to block 702.

A server application may be configured to provide different types of error messages in response to an incorrect decryption key. If the requesting client has required credentials (i.e. it is an application within a firewall protected system, an application within the same machine, and the like) the server application may provide detailed information about the error such as wrong decryption key, remote database inaccessible, outdated decryption key, and the like. On the other hand, for clients outside a secure system, a system administrator may not want to provide detailed information. In that case, a predetermined brief error message may be issued such as "configuration error".

If the determination at decision block 710 is affirmative, processing advances to block 712, where the provider is asked to decrypt the protected data. Next, processing moves to decision block 714.

At decision block 714, a determination is made whether the decryption provider is able to decrypt the protected data. If the decision is negative, processing moves to block 716, where an error message is issued. Processing then returns to block 702. If the decision at block 714 is affirmative, processing moves to block 718, where the protected data is decrypted. Decryption is transparent to the application consuming the protected configuration data.

From block 718, processing advances to block 720, where a response to the request is prepared by the server application using the decrypted protected data. Processing then moves to block 722.

At block 722, the response is stored in an output file. Next, processing proceeds to block 724, where the output file is provided to a user. The user may be a client application such as a web browser communicating with the web server.

In one embodiment, the response may be prepared as an XML file. In another embodiment, the output file may be an HTML file based on the XML response file. After block 724, processing proceeds to a calling process for further actions.

Process 700 is an example embodiment for illustration purposes. The invention is not limited to the flowchart blocks or the order of blocks of process 700. Other embodiments of the present invention may be implemented in another process with fewer or additional blocks and in other orders without departing from the scope and spirit of the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for protecting connection strings in a mark-up language (ML) configuration file, the method comprising:
    receiving a request on a configuration server, wherein the request includes a request for sensitive configuration setting data located in a database of the configuration server, wherein the request includes decryption provider information;
    in response to receiving the request, retrieving a ML configuration file related to the request, wherein the ML configuration file includes encrypted connection strings used to obtain the sensitive configuration setting data from the database of the configuration server;
    in response to retrieving the ML configuration file related to the request, utilizing the decryption provider information to decrypt the connection strings of the ML configuration file;
    accessing, by the configuration server, the sensitive configuration setting data located in the database of the configuration server based on the decrypted connection strings;
    building, by the configuration server, an output file that includes the sensitive configuration setting data; and
    sending the output file to a sender of the request.

2. The computer-implemented method of claim 1, wherein the decryption provider information includes a location of a decryption provider, wherein utilizing the decryption provider information to decrypt the connection strings of the ML configuration file includes sending the ML configuration file to the location of the decryption provider for decryption.

3. The computer-implemented method of claim 1, wherein the connection strings are encrypted by at least one member of a group comprising: RSA encryption, password wrap encryption, and computational-based encryption.

4. The computer-implemented method of claim 1, wherein the ML configuration file includes a provider of encryption for the encrypted connection strings.

5. The computer-implemented method of claim 1, wherein the ML configuration file includes an address for an encryption type, an address for an encryption method and an address for an encryption key.

6. The computer-implemented method of claim 1, wherein the output file is a ML output file.

7. The computer-implemented method of claim 6, wherein the ML output file is at least one member of a group comprising: an XML output file and a HTML output file.

8. A computer-readable storage medium having computer-executable instructions for protecting connection strings in a mark-up language (ML) configuration file, the instructions comprising:
    receiving a request on a configuration server, wherein the request includes a request for sensitive configuration setting data located in a database of the configuration server;
    in response to receiving the request, retrieving a ML configuration file related to the request, wherein the ML configuration file includes encrypted connection strings used to obtain the sensitive configuration setting data from the database of the configuration server;
    in response to retrieving the ML configuration file related to the request, utilizing decryption provider information to decrypt the connection strings of the ML configuration file;
    accessing, by the configuration server, the sensitive configuration setting data located in the database of the configuration server based on the decrypted connection strings;
    building, by the configuration server, an output file that includes the sensitive configuration setting data; and
    sending the output file to a sender of the request.

9. The computer-readable storage medium of claim 8, wherein the decryption provider information includes a location of a decryption provider, wherein utilizing the decryption provider information to decrypt the connection strings of the ML configuration file includes sending the ML configuration file to the location of the decryption provider for decryption.

10. The computer-readable storage medium of claim 8, wherein the connection strings are encrypted by at least one member of a group comprising: RSA encryption, password wrap encryption, and computational-based encryption.

11. The computer-readable storage medium of claim 8, wherein the ML configuration file includes a provider of encryption for the encrypted connection strings.

12. The computer-readable storage medium of claim 8, wherein the ML configuration file includes an address for an encryption type, an address for an encryption method and an address for an encryption key.

13. The computer-readable storage medium of claim 8, wherein the output file is a ML output file.

14. The computer-readable storage medium of claim 13, wherein the ML output file is at least one member of a group comprising: an XML output file and a HTML output file.

15. A system for protecting connection strings in a mark-up language (ML) configuration file, the system comprising:
 a processor of a configuration server; and
 a memory of a configuration server having computer-executable instructions stored thereon, wherein the computer-executable instructions are configured for:
  receiving a request, wherein the request includes a request for sensitive configuration setting data located in a database of the configuration server;
  in response to receiving the request, retrieving a ML configuration file related to the request, wherein the ML configuration file includes encrypted connection strings used to obtain the sensitive configuration setting data from the database of the configuration server;
  in response to retrieving the ML configuration file related to the request, utilizing decryption provider information to decrypt the connection strings of the ML configuration file;
  accessing the sensitive configuration setting data located in the database of the configuration server based on the decrypted connection strings;
  building an output file that includes the sensitive configuration setting data; and
  sending the output file to a sender of the request.

16. The system of claim 15, wherein the decryption provider information includes a location of a decryption provider, wherein utilizing the decryption provider information to decrypt the connection strings of the ML configuration file includes sending the ML configuration file to the location of the decryption provider for decryption.

17. The system of claim 15, wherein the connection strings are encrypted by at least one member of a group comprising: RSA encryption, password wrap encryption, and computational-based encryption.

18. The system of claim 15, wherein the ML configuration file includes a provider of encryption for the encrypted connection strings.

19. The system of claim 15, wherein the ML configuration file includes an address for an encryption type, an address for an encryption method and an address for an encryption key.

20. The system of claim 15, wherein the output file is a ML output file.

\* \* \* \* \*